T. J. BEAUDETTE.
WAVE MOTOR.
APPLICATION FILED JUNE 29, 1909.

982,928.

Patented Jan. 31, 1911.

Witnesses:

Inventor:
Telesphore J. Beaudette
by Tomneus Lyons & Hackley
his attys.

THE NORRIS PETERS CO., WASHINGTON, D. C.

UNITED STATES PATENT OFFICE.

TELESPHORE J. BEAUDETTE, OF LOS ANGELES, CALIFORNIA.

WAVE-MOTOR.

982,928.      Specification of Letters Patent.     Patented Jan. 31, 1911.

Application filed June 29, 1909. Serial No. 505,066.

*To all whom it may concern:*

Be it known that I, TELESPHORE J. BEAUDETTE, a citizen of the United States, residing at Los Angeles, in the county of Los Angeles and State of California, have invented a new and useful Wave-Motor, of which the following is a specification.

The main object of the present invention is to provide a wave motor which will utilize to the fullest extent the power of the waves. In this connection the invention provides for speeding up the transmission mechanism *i. e.*, the power shaft during the latter part of the stroke of the wave actuating means, this period corresponding to the time of greatest development of power by the waves.

Another object of the invention is to provide for adjusting the height of the wave receiving means in correspondence with the fluctuations in the tide, etc.

Another object of the invention is to provide an improved means for counterbalancing the wave receiving means.

A further object of the invention is to provide an improved wave receiving means or surface.

Other objects of the invention will appear hereinafter.

Figure 1:
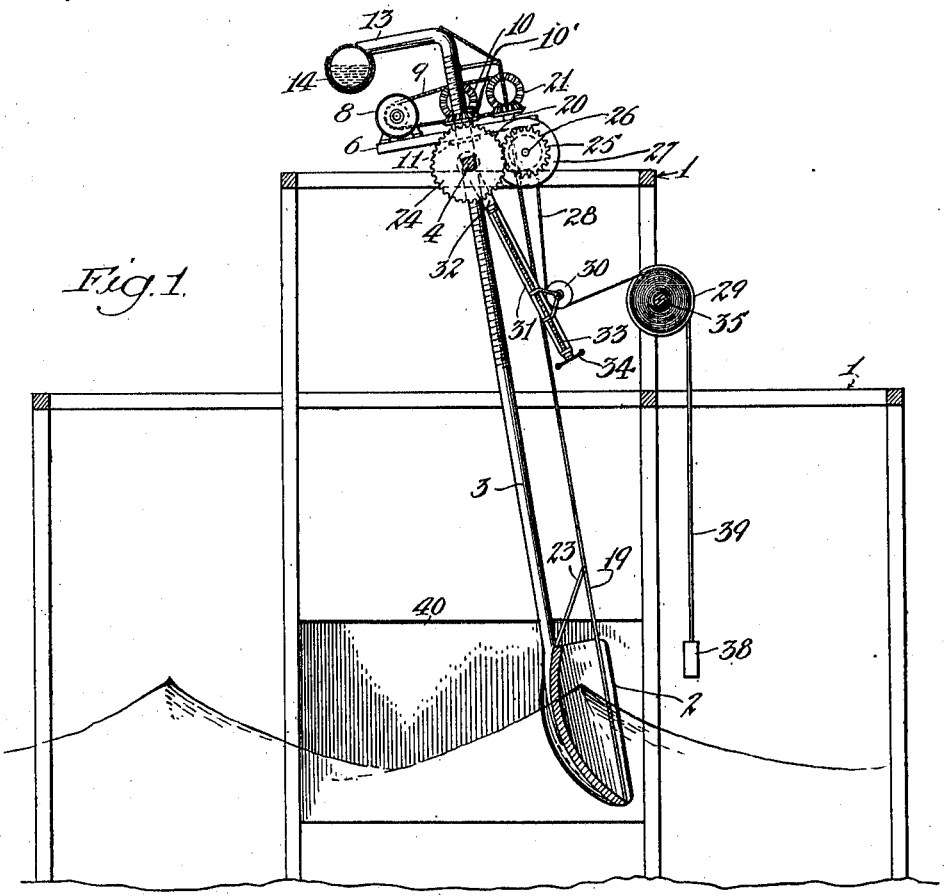
Figure 3:
Figure 2:
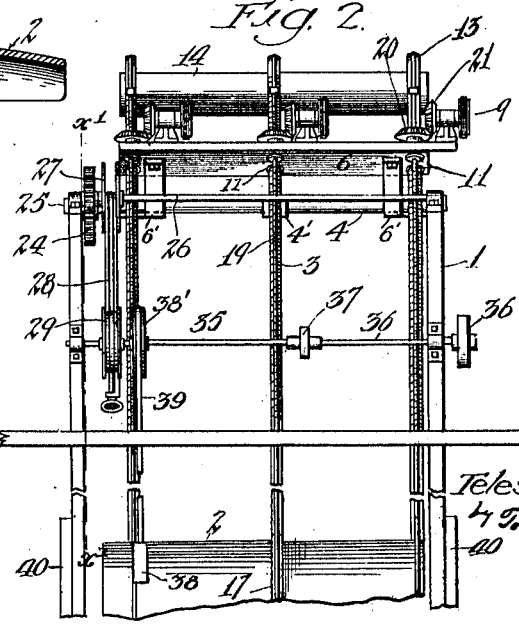
Figure 4:
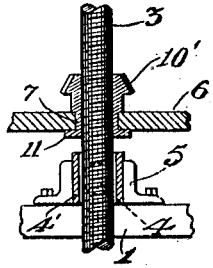

The accompanying drawings illustrate the invention, and referring thereto:

Figure 1 is a side elevation of the mechanism showing the supporting frame and the wave receiving means in section. Fig. 2 is a front elevation of the upper portion of the mechanism. Fig. 3 is a horizontal section of the wave receiving means. Fig. 4 is a detail sectional view of a part of the suspension means.

1 designates a frame which may be formed as a pier or trestle built on the bed of the body of water whose waves are to be utilized. On this frame are supported any desired number of the motors, one of which is herein illustrated. Said motor comprises a wave receiving means or member 2 carried by suspension rods 3 which are supported on a shaft 4 mounted to rock in journals 5 on the frame 1. Said bars or rods 3 are movable vertically through eyes 4' in the shaft 4, a frame or platform 6 being carried by said shaft 4 by means of brackets 6', said bars 3 being mounted to move vertically in threaded guides or ways 7 formed in nuts 11 journaled in said platform 6.

The weight of the parts being considerable, it is preferred to provide power driven means for effecting this vertical adjustment, a motor 8 being provided on the platforms 6 connected by sprocket chains 9 and bevel gears 10', with nuts 11 journaled in the platform 6, the bars or rods 3 extending, respectively, through said nuts and being screw-threaded to engage the same, so that the rotation of the nuts will cause the bar to ascend or descend, carrying with it the wave receiving means 2. A set of gear connections 9, 10, 10' and nut 11 is provided for each bar 3, these sets working in unison, so that the bars and the wave receiving means 2 are raised or lowered as a unitary member. The said nuts 11 are formed as extensions on the gear wheels 10'.

Counterweight means is provided for causing the wave receiving means to have a tendency to move forwardly, so as to return after each wave action. For this purpose the upper end of bar 3 may be offset or extended backwardly as shown at 13 and provided at its rear end with a tank or cylinder 14 for containing water serving as a weight for moving the member 2 forwardly. By varying the amount of water contained in the tank 14, the effect of the counterweight means may be varied as desired.

The wave receiving means 2 is preferably formed as a scoop of more or less bowl-shaped surface having a concave or rounded rear wall, as shown at 16 in Fig. 3, and a partition or flange 17 may be provided at about mid-length of the member 2 extending forwardly from the rear wall to receive the diagonal impact, if any, of the waves. The member 2 is curved in a vertical as well as in a horizontal plane, its lower portion extending or bending forwardly as shown in Fig. 1. To brace or further support member 2, tie-rods or brace rods 19 may be provided extending from the lower edge of the member 2 up to the platform 6, said tie-rods extending through said platform and being operated by nuts 20, bevel gears 21, and sprocket chains 9, similarly to the operation of the main suspension rods 3, so that all of the suspension and tie-rods move in unison. Cross tie-rods or brace rods 23 may be provided extending from tie-rods 19 to the upper part of the wave receiving member 2. Rock shaft 4 carries a gear wheel 24 meshing with a gear wheel 25 on a shaft 26 journaled on the frame 1. Said shaft 26 carries a drum 27 which is fast thereon. A cable 28 winds around said drum making a plurality of turns thereon and also winds around a drum 29 making a plurality of turns on the latter drum, said drum 29 being carried by a shaft 35 journaled on the frame 1. Said cable also passes around a guide pulley 30 journaled in a bracket 31 which slides on a rocking frame 32 secured to the shaft 4 to rock therewith, said bracket 31 being adjustable radially on said frame with respect to said shaft by means of a screw 33 operated by hand wheel 34, said screw engaging said bracket to move it along the rocking frame 32. Shaft 35 is connected to another shaft 36 also journaled on frame 1, by a clutch 37 which engages to operatively connect said shafts in the forward direction of rotation of shaft 35 but is inoperative during the reverse rotation. Shaft 36 is provided with means, such as a pulley 36', for taking off the power. A counterweight 38 is connected by cable 39 to a drum 38' on shaft 35 to cause rewinding of the cable 28 on drum 29 in the return movement of the wave actuated means 2.

At each end of the wave receiving member 2 a wall or deflector 40 is provided on frame 1 to cause waves approaching obliquely to be deflected more directly onto the member 2.

The operation is as follows: Each oncoming wave as it strikes the member 2 presses said member rearwardly causing the wave receiving means, consisting of said member 2, bars 3 and platform 6, to rock on the shaft 4. In this movement the said shaft 4 operates through the gear wheels 24 and 25 to turn the drum 27 causing said drum to wind the cable 28 thereon and to unwind the cable from the drum 29. The consequent rotation of the shaft 35 is communicated to shaft 36 through the clutch 37. Furthermore, in this rocking movement of the aforesaid parts 2, 3 and 6, the frame 32 is carried therewith in the rocking movement drawing the pulley 30 rearwardly, so as to increase the length of cable between the pulleys 27, 29, and thereby accelerate the rotation of the drum 29. The rotation of said drum 29 is further accelerated by reason of the fact that in the rotation thereof during the operative stroke of the wave receiving member 2 the cable is wound on drum 27 and unwound on the drum 29, so that there is a continual increase in the operating radius of the drum 27, thereby producing greater speed in the latter part of the stroke, which is the part of greatest effect, and a continual decrease in the operating radius of drum 29. The operation of the guide pulley 30 in controlling the power developed by the device may be controlled or adjusted by adjusting the said pulley radially of the supporting bracket 31 by means of screw 33. As the wave recedes the member 2 is returned by operation of the counterweight 14 and the cable 28 is rewound on drum 29 by operation of counterweight 38. The alternating rotation of the shaft 35 produced by successive waves, acting in the manner above described produces an intermittent unidirectional rotation of the shaft 36, through the intermediation of the clutch 37.

What I claim is:

1. In a wave motor, the combination with a wave actuated rocking means, a driven shaft, and means for increasing the speed of operation of the driven shaft at the latter part of the operating stroke.

2. In a wave motor, the combination with a wave actuated rocking means, of gearing connected to said wave actuated means, a driven shaft, a connection from said gearing to said driven shaft, for increasing the speed of operation of the driven shaft at the latter part of the operating stroke, comprising a drum on the driven shaft, a drum connected to the gearing, and a cable winding over said drums to wind off on one of the drums as it winds on to the other.

3. In a wave motor, the combination with a wave actuated rocking means, of gearing connected to said wave actuated means, a driven shaft, a connection from said gearing to said driven shaft, for increasing the speed of operation of the driven shaft at the latter part of the operating stroke, comprising a drum on the driven shaft, a drum connected to the gearing, a cable winding over said drums to wind off on one of the drums as it winds on to the other, a wheel engaging said cable to deflect it, and a support for said wheel mounted to move with the rocking means.

4. In a wave motor, the combination with a wave actuated rocking means, of gearing connected to said wave actuated means, a driven shaft, a connection from said gearing to said driven shaft, for increasing the speed of operation of the driven shaft at the latter part of the operating stroke, comprising a drum on the driven shaft, a drum connected to the gearing, a cable winding over said drums to wind off on one of the drums as it winds on to the other, a wheel engaging said cable to deflect it, a support for said wheel mounted to move with the rocking means, and means for adjusting the position of the said wheel on said support to vary the power of the motor.

5. A wave actuated member, a supporting frame, means mounted to rock on said frame, and suspension means for the wave actuated member, mounted to move vertically in said rocking means, means for adjusting the vertical position of the suspension means on the rocking means, and power transmitting means connected to the rocking means.

6. A wave actuated member, a supporting frame, means mounted to rock on said frame, suspension bars for the wave actuated member, mounted to move vertically in said rocking means and provided with screw threads, nuts journaled in the rocking means, a motor connected to rotate said nuts, and power transmission means connected to and operated by said rocking frame.

7. In a wave motor, a scoop shaped wave actuated member, concavely curved in a horizontal direction and provided intermediate its ends with a forwardly extending flange.

8. In a wave motor, the combination with a frame, a rocking means thereon, a wave actuated member mounted in said rocking means, power transmitting means connected to said rocking means, and a wave deflecting wall on the frame at each side of the wave actuated member.

9. In a wave motor, the combination of a frame, a rocking means thereon, a wave actuated member, means supporting the wave actuated member on said rocking means, power transmitting means connected to said rocking means, and a weight connected to the upper part of the supporting means for the wave actuated member, said weight being located rearwardly of the rocking support to produce a forward tendency on the wave actuated member.

In testimony whereof, I have hereunto set my hand at Los Angeles, California, this 23rd day of June 1909.

TELESPHORE J. BEAUDETTE.

In presence of—
ARTHUR P. KNIGHT,
FRANK L. A. GRAHAM.